(12) United States Patent
Chang

(10) Patent No.: US 6,309,099 B1
(45) Date of Patent: Oct. 30, 2001

(54) DEVICE FOR DETECTING TEMPERATURE INSIDE A NOTEBOOK COMPUTER

(75) Inventor: Nai-Shung Chang, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/313,517

(22) Filed: May 17, 1999

(30) Foreign Application Priority Data

Apr. 13, 1999 (TW) ................................. 88105831

(51) Int. Cl.⁷ ........................ G01K 7/16; G06F 9/18
(52) U.S. Cl. ............................ 374/183; 710/260
(58) Field of Search .................... 374/183, 178, 374/152; 710/260; 377/25, 26; 713/324, 322, 320

(56) References Cited

U.S. PATENT DOCUMENTS

| | | | |
|---|---|---|---|
| 3,973,147 | * | 8/1976 | Yu ........................... 307/310 |
| 5,024,535 | * | 6/1991 | Winston, Jr. ............... 374/178 |
| 5,085,526 | * | 2/1992 | Sawtel et al. .............. 374/170 |
| 5,700,089 | * | 12/1997 | McKinnon ................. 374/142 |
| 6,003,100 | * | 12/1999 | Lee ........................... 710/102 |
| 6,011,371 | * | 1/2000 | Van Brocklin et al. ....... 318/471 |
| 6,029,251 | * | 2/2000 | Williams et al. ............. 713/501 |
| 6,069,793 | * | 5/2000 | Maruyama et al. .......... 361/687 |
| 6,105,119 | * | 8/2000 | Kerr et al. ................... 711/219 |
| 6,112,273 | * | 8/2000 | Kau et al. ................... 710/260 |

FOREIGN PATENT DOCUMENTS

0095225 * 6/1983 (JP) .

* cited by examiner

Primary Examiner—Diego Gutierrez
Assistant Examiner—Gail Verbitsky
(74) Attorney, Agent, or Firm—Jiawei Huang; J. C. Patents

(57) ABSTRACT

A temperature sensing system for monitoring and controlling temperatures of various peripheral devices inside a notebook type of computer. The temperature sensing system uses a thermistor as a temperature sensor. The thermistor is positioned around a peripheral device and forms a potential divider circuit with another resistor. Next, the voltage produced by the divider circuit is fed to a voltage detection pin of a chipset. Inside the chipset, the divider voltage can be compared with a reference so that appropriate action can be taken to cool down a particular peripheral device. In addition, the temperature sensor of this invention can be placed anywhere inside a notebook computer including the area surrounding the peripheral device or even inside the peripheral device. Moreover, no additional control chips for operating those temperature sensors are needed, and hence production cost can be lowered.

14 Claims, 3 Drawing Sheets

DEVICE FOR DETECTING TEMPERATURE INSIDE A NOTEBOOK COMPUTER

CROSS-REFERENCE TO RELATED APPLICATION

This application claims the priority benefit of Taiwan application serial no. 88105831, filed Apr. 13, 1999, the full disclosure of which is incorporated herein by reference.

BACKGROUND OF THE INVENTION

1. Field of Invention

The present invention relates to a device for detecting and a method for conditioning temperature. More particularly, the present invention relates to a temperature sensor for detecting the temperatures of various heat-generating peripheral devices inside a notebook computer using a potential divider circuit constructed from a thermistor and resistor. Variable voltage produced by the potential divider circuit is then returned to the chipset inside the computer for controlling the temperature of those peripheral devices.

2. Description of Related Art

Inside a conventional notebook computer, a number of interface devices, for example, a central processing unit (CPU), an integrated device electronics (IDE) interface and a personal computer memory card international association (PCMCIA) interface are generally mounted on top of a main circuit board. As the notebook computer is used the temperature of these internal components will rise.

FIG. 1 is a sketch showing the major internal components inside a conventional notebook computer. As shown in FIG. 1, internal components includes a main circuit board 10 with a central processing unit 12, an IDE device 14, a PCMCIA device 16 and a chipset 18 mounted on top. In general, a fan (not shown) is also mounted on top of the central processing unit 12 for dissipating the heat generated by the central processing unit 12. Similarly, fans 20 and 22 are also installed at the respective backsides of the IDE device 14 and the PCMCIA device 16 for carrying away the heat generated by the IDE device 14 and the PCMCIA device 16 respectively. In addition, a battery pack 24 is usually installed somewhere around the main board 10 to provide the necessary power for operating the notebook computer.

The main heat-producing source inside the notebook computer is the central processing unit 12. Due to operation, heat produced by the central processing unit 12 will diffuse towards surrounding peripheral devices. Therefore, temperature of the neighboring peripheral devices such as the IDE device 14 and the PCMCIA device 16 will gradually rise. Consequently, most notebook computers have additional fans (not shown) installed in the neighborhood of the central processing unit 12 for cooling down the peripheral devices.

However, if the fans operate continuously, they may easily break down. In contrast, if the user operates the computer erroneously, the cooling fan may not operate at all. Furthermore, if the central processing unit has problems or the battery pack is over-charged, individual devices may be overheated. Therefore, if there is no mechanism for detecting the degree of heating in those devices and responding just in time to lower the temperature, the devices may be irreversibly damaged.

To detect the temperature of various peripheral devices, the simplest method is to install a temperature sensor next to each peripheral device. However, this method will definitely increase the loading of the integrated circuit (IC) and the hardware monitoring device in addition to the increased cost of production.

In light of the foregoing, there is a need to provide a new type of temperature sensor having a different method of operation.

SUMMARY OF THE INVENTION

Accordingly, the present invention provides a device capable of sensing temperature around the peripheral devices inside a notebook computer and a method for controlling temperatures of various peripheral devices so that their permissible operating temperature will not be exceeded.

To achieve these and other advantages and in accordance with the purpose of the invention, as embodied and broadly described herein, the invention provides a method of connecting up a temperature sensor for monitoring and controlling temperature of peripheral devices inside a notebook computer. The temperature sensor comprises of a thermistor and a resistor. One terminal of the thermistor is coupled to a voltage source. The other terminal of the thermistor is connected to one terminal of the resistor as well as a voltage detection pin of a chipset. The other terminal of the resistor is connected to a ground.

For an alternative coupling architecture, the thermistor can be connected between the ground and the voltage detection pin of a chipset, and one terminal of the resistor is connected to voltage source.

The temperature sensors inside the notebook computer according to this invention are thermistors that are attached to peripheral devices with the possibility of being overheated due to operation. Each thermistor is connected with a resistor to form a potential divider circuit. By tapping a voltage from the potential divider circuit and sending the voltage to the pin of a chipset, temperatures of various peripheral devices can be detected. Hence, appropriate controlling signals can be returned by the chipset, for example, to stop the operation of a particular device or lowering the operating frequency of that device.

The temperature sensor or thermistor can be installed anywhere within the notebook computer, for example, surrounding area of the peripheral devices or inside the peripheral devices. Furthermore, no controlling chips need to be added for supporting the temperature sensors. Hence, no additional production cost must be accounted for.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
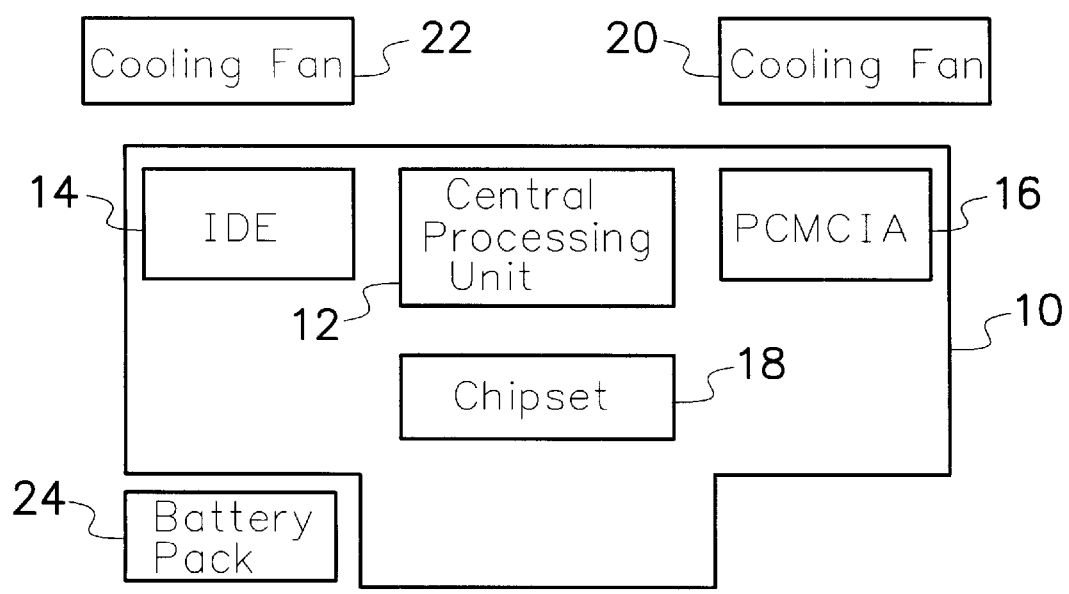
FIG. 1 is a sketch showing the major internal components inside a conventional notebook computer.

Reference will now be made in detail to the present preferred embodiments of the invention, examples of which are illustrated in the accompanying drawings. Wherever possible, the same reference numbers are used in the drawings and the description to refer to the same or like parts.

Since the power supplying system of a notebook computer already has a voltage detecting and adjusting function, power output will automatically be cut off if any abnormal voltage is sensed. Therefore, the voltage detection pin on the peripheral controlling chip (for example, the south bridge) will be redundant. This is not like a desk computer that needs not to integrate all peripheral devices into one and therefore needs the peripheral controlling chip. This invention uses the redundant voltage detection pins of the south bridge in a notebook computer as a means of sensing the temperatures of various peripheral devices. The four voltage detection pins of the south bridge are capable of detecting voltages of 12V, 5V, 3.3V and 2.5V respectively.

Figure 2:
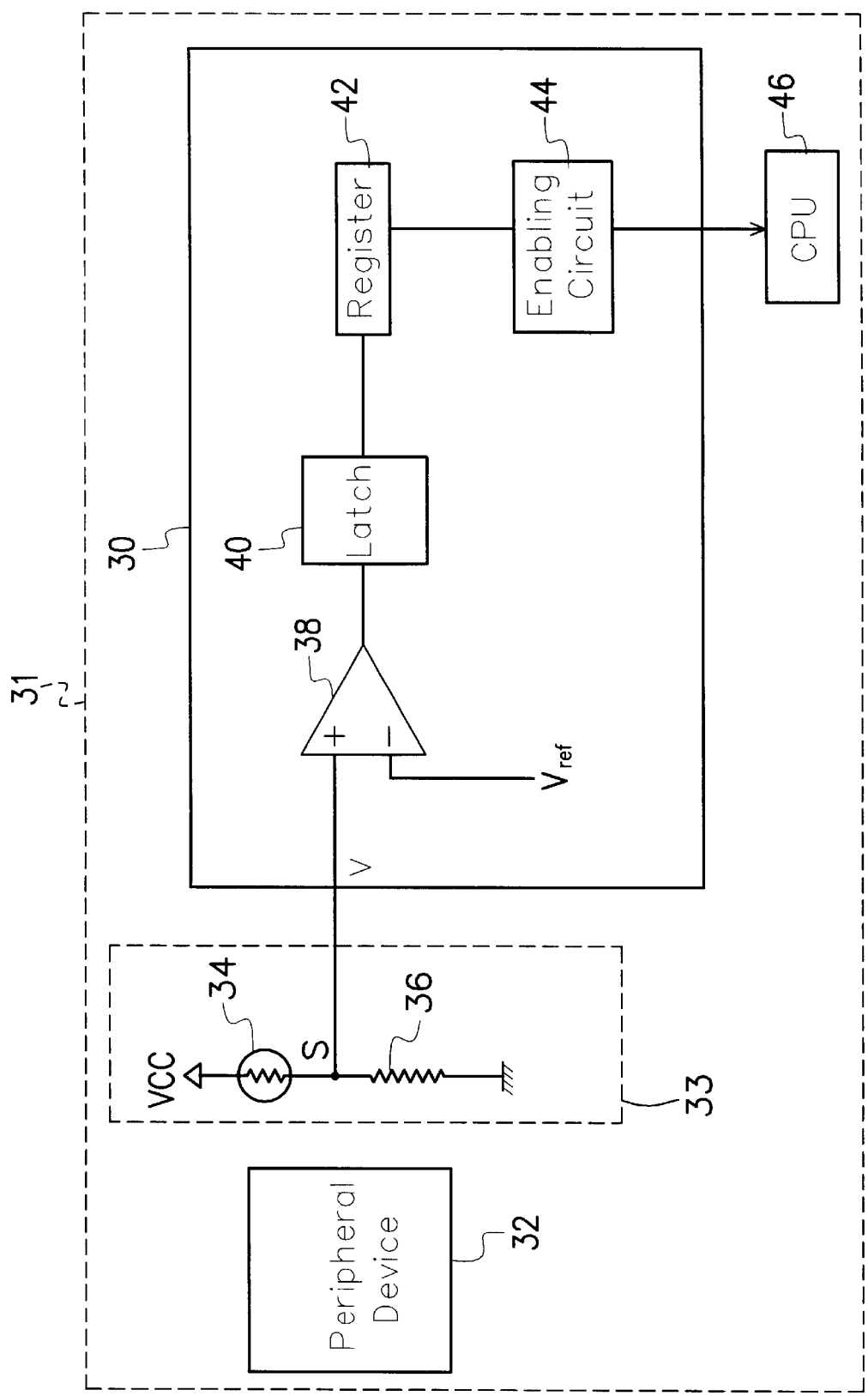
FIG. 2 is a circuit diagram showing a temperature sensor installed next to a peripheral device inside a notebook computer according to one preferred embodiment of this invention.

FIG. 2 is a circuit diagram showing a temperature sensor installed next to a peripheral device inside a notebook computer according to one preferred embodiment of this invention.

A temperature sensor 33 of this invention comprises a thermistor 34 and a resistor 36. As shown in FIG. 2, one terminal of the thermistor 34 is connected to a voltage source Vcc. The other terminal of the thermistor 34 is connected to one terminal of the resistor 36 as well as to one of the voltage detection pins of a chipset 30. The other terminal of the resistor 36 is connected to a ground. Note that the temperature sensor 33 of this invention can be installed anywhere around a peripheral device 32 or installed right inside. In other words, the temperature sensor 33 can be installed almost anywhere inside the notebook computer 31 for monitoring and controlling the temperature of any devices capable of overheating. Furthermore, the peripheral device 32 can be any one of the devices in FIG. 1 such as the IDE device 14, the PCMCIA device 16, the battery pack 24, or a liquid crystal display (LCD, not shown).

Figure 3:
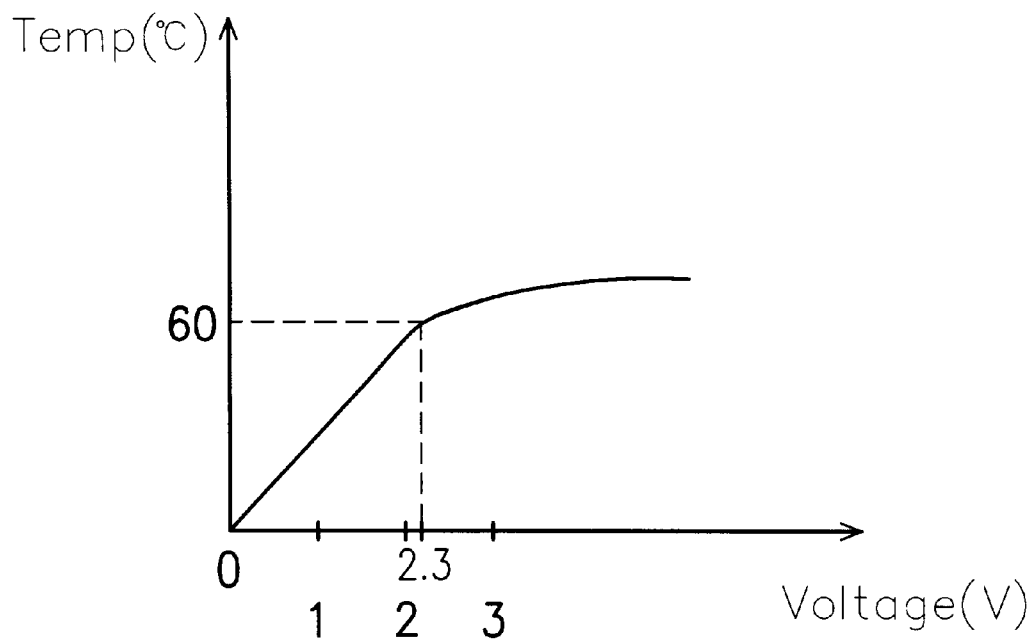
FIG. 3 is a curve of measured temperature of the thermistor versus the produced voltage, which is induced by its resistance.

The thermistor 34 is a device whose resistance will change according to surrounding temperature. FIG. 3 is a curve of measured temperature of the thermistor versus the produced voltage, which is induced by its resistance. In FIG. 3, as the thermistor 34 is at a temperature of about 60° C., it produces a voltage of about 2.3V. The produced voltage varies with the temperature of it environment. Referring to FIG. 2, by joining the thermistor 34 and the resistor 36 in series to form a potential divider circuit, potential at the node point S will change according to the surrounding temperature. Since the thermistor 34 is attached next to a peripheral device 32, any changes in temperature will be reflected as a voltage change at the node point S. Because node point S is connected to a voltage detection pin of the chipset 30, the chipset 30 is able to register the actual temperature of the peripheral device 32. By monitoring the temperature, a program dealing with particular over-heated device can be carried out by the chipset accordingly. For example, depending upon the actual temperature of a peripheral device 32, the device might be stopped temporarily to let the temperature fall. In addition, since the permitted temperature range for a peripheral device 32 is less critical than a central processing unit, it is sufficient to monitor and detect the temperatures of various peripheral devices 32 using the above method.

An operation of the temperature sensor 33 used in the chipset 30 is, for example, following. A voltage detecting pin with a detected voltage V is connected to a positive terminal of an internal comparator 38, of which a negative terminal is connected to a reference voltage $V_{ref}$. The comparator 38 compares the detected voltage V with the $V_{ref}$ to monitor the status of the detected voltage V. If the comparator 38 detects an abnormal status that the detected voltage V at the node S is over the $V_{ref}$, the comparator 38 issues an abnormal signal to a latch 40. The latch 40 then latches the abnormal signal and sends it to a resister 42 and then to an enabling circuit 44. The enabling circuit 44 is therefore enabled and sends the abnormal signal to a central processing unit (CPU) 46. As the abnormal signal is received by the CPU 46, the CPU 46 immediately starts an urgent action, such as issuing an interruption signal to the peripheral device 32 to stop its operation, reduce its operation frequency, turn off the power of the computer, or urgently even shut down the computer so as to avoid over-heating of the peripheral device 32 or any device in the computer.

In summary, the temperature sensing system of this invention utilizes a thermistor 34 as a temperature sensor. The thermistor 34 senses the temperature of a heat-producing device inside the notebook computer, and then the temperature level is converted into a voltage level through a potential divider circuit. The voltage is next relayed to the voltage detection pins of a chipset 30. The chipset 30 then compares the voltage gathered from the peripheral device with a norm before proper action such as stopping the operation or decreasing the rate of operation of a particular peripheral device is carried out. Since the thermistor is a low-cost device and is able to be attached almost anywhere inside a notebook computer, the temperature sensor system is able to protect various temperature sensitive or heat-producing devices that has a potential danger of being overheated. Furthermore, the combination of thermistors 34 and the voltage detection pins of the chipset 30 can lower production cost because no additional controlling chip is required.

Figure 4:
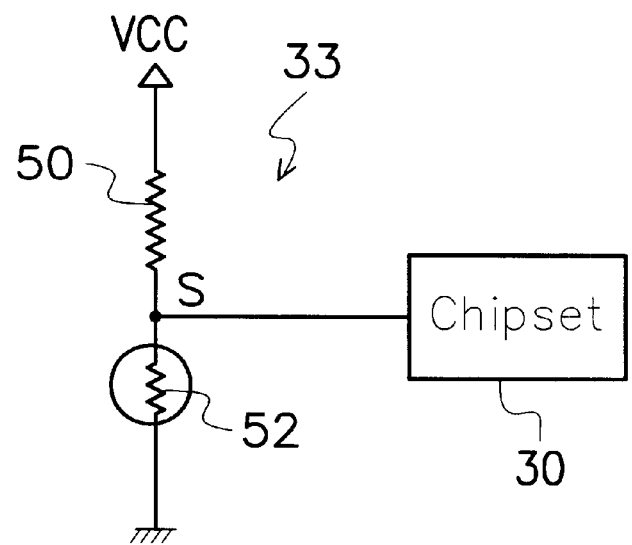
FIG. 4, is circuit architecture, schematically illustrating a temperature sensor installed in a notebook, according to the preferred embodiment of the invention.

The temperature sensor 33 can be used in various designs. Another example is shown in FIG. 4. One terminal of a resistor 50 is coupled to a voltage source Vcc and the other terminal is coupled to a voltage detecting pin of a chipset 30 and one terminal of a thermistor 52. The other terminal of the themistor 52 is grounded. Generally, the temperature sensor 33 can be connected any place which potentially may get over-heated so as to monitor its temperature.

Therefore, the advantages of this invention includes:
1. The thermistor or temperature sensor can be placed almost anywhere inside a note book computer, such as somewhere around a peripheral device or in the interior of the peripheral device.
2. No additional controlling chip is required to service the temperature sensor. Hence, production cost is saved.
3. Voltage detection points of a chipset, such as the south bridge, can be used to monitor and control the temperature of various peripheral devices.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A temperature sensor inside a notebook computer that contains a chipset and at least one peripheral device, comprising:
    a thermistor, of which a first terminal of the thermistor is connected to a voltage source while a second terminal of the thermistor is connected to a voltage detection pin of the chipset; and a resistor, of which a first terminal of the resistor is connected to the second terminal of the thermistor while a second terminal of the resistor is connected to a ground.

2. The temperature sensor of claim 1, wherein the temperature sensor is installed somewhere around the peripheral device within a notebook computer.

3. The temperature sensor of claim 1, wherein the chipset includes a south bridge.

4. The temperature sensor of claim 2, wherein the peripheral device includes a liquid crystal display unit.

5. The temperature sensor of claim 2, wherein the peripheral device includes an integrated device electronics (IDE) device.

6. The temperature sensor of claim 2, wherein the peripheral device includes a personal computer memory card international association (PCMCIA) interface.

7. The temperature sensor of claim 2, wherein the peripheral device includes a battery pack.

8. A temperature sensor inside a notebook computer that contains a chipset and at least one peripheral device, comprising:

a thermistor, of which a first terminal of the thermistor is grounded and a second terminal of the thermistor is connected to a voltage detection pin of the chipset; and a resistor, of which a first terminal of the resistor is connected to a voltage source and a second terminal of the resistor is connected to the second terminal of the thermistor.

9. The temperature sensor of claim 8, wherein the temperature sensor is installed somewhere around the peripheral device within a notebook computer.

10. The temperature sensor of claim 8, wherein the chipset includes a south bridge.

11. The temperature sensor of claim 8, wherein the peripheral device includes a liquid crystal display unit.

12. The temperature sensor of claim 8, wherein the peripheral device includes an integrated device electronics (IDE) device.

13. The temperature sensor of claim 8, wherein the peripheral device includes a personal computer memory card international association (PCMCIA) interface.

14. The temperature sensor of claim 8, wherein the peripheral device includes a battery pack.

* * * * *